(12) United States Patent
Hauert et al.

(10) Patent No.: US 6,710,980 B1
(45) Date of Patent: Mar. 23, 2004

(54) DISK DRIVE COMPRISING AN INERTIAL ACTUATOR LATCH WITH STRIP-SPRING BIASING

(75) Inventors: Serge Hauert, San Jose, CA (US); Shawn E. Casey, San Jose, CA (US); Haldun Arin, San Ramon, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 164 days.

(21) Appl. No.: 09/753,280

(22) Filed: Dec. 27, 2000

(51) Int. Cl.[7] ............................ G11B 5/54
(52) U.S. Cl. ............................ 360/256.4
(58) Field of Search ................ 360/256.4, 96.5

(56) References Cited

U.S. PATENT DOCUMENTS

| | | | |
|---|---|---|---|
| 5,303,101 A | 4/1994 | Hatch et al. | 360/256 |
| 5,404,257 A | 4/1995 | Alt | 360/256.4 |
| 5,636,090 A | 6/1997 | Boigenzahn et al. | 360/256.4 |
| 5,870,256 A * | 2/1999 | Khanna et al. | 360/256.4 |
| 5,875,075 A * | 2/1999 | Hickox | 360/256.4 |
| 6,028,746 A * | 2/2000 | Matsumura | 360/256.4 |
| 6,091,587 A | 7/2000 | Hatch et al. | 360/256.4 |
| 6,163,440 A | 12/2000 | Takahashi et al. | 360/256.4 |
| 6,327,119 B1 * | 12/2001 | Barina et al. | 360/256.4 |
| 6,417,984 B1 * | 7/2002 | Tamura et al. | 360/96.5 |

* cited by examiner

Primary Examiner—Tianjie Chen
(74) Attorney, Agent, or Firm—Won Tae C. Kim, Esq.; Milad G. Shara, Esq.; Howard H. Sheerin, Esq.

(57) ABSTRACT

A disk drive comprises a disk, an actuator arm, a head attached to the actuator arm, a voice coil motor, a parking latch for latching the actuator arm in a latched position in order to park the head during a non-operating mode, a post, and an inertial latch for maintaining the actuator arm in the latched position when the disk drive is subjected to a physical shock. The inertial latch comprises a body having a protruding arm and a pivot surface, wherein during the physical shock the body rotates about the pivot surface such that the protruding arm engages the actuator arm. The body of the inertial latch further comprises a strip-spring comprising a first end inserted into a first receptor and a second end inserted into a second receptor such that the strip spring has an initial arc displacement when installed into the body of the inertial latch.

16 Claims, 6 Drawing Sheets

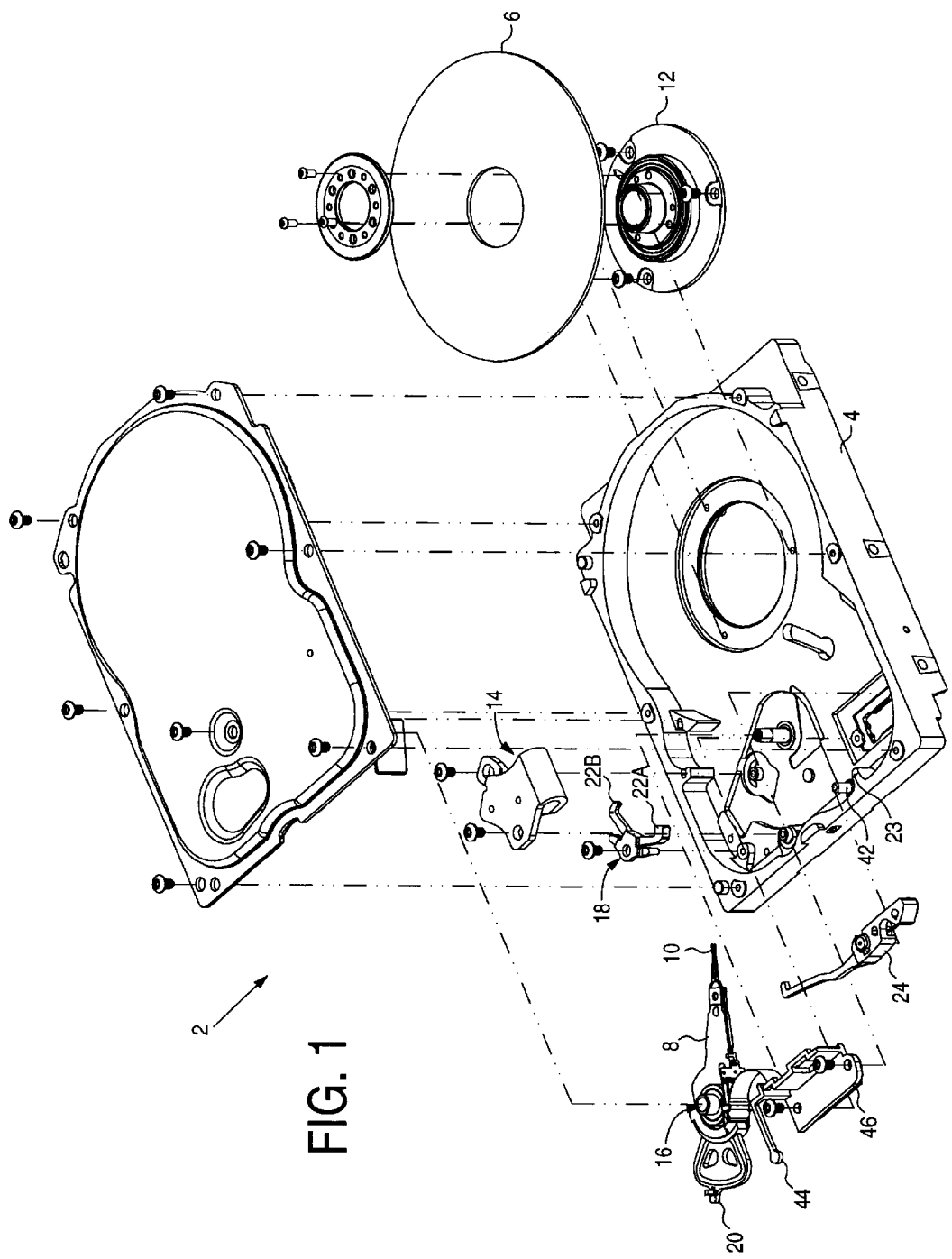

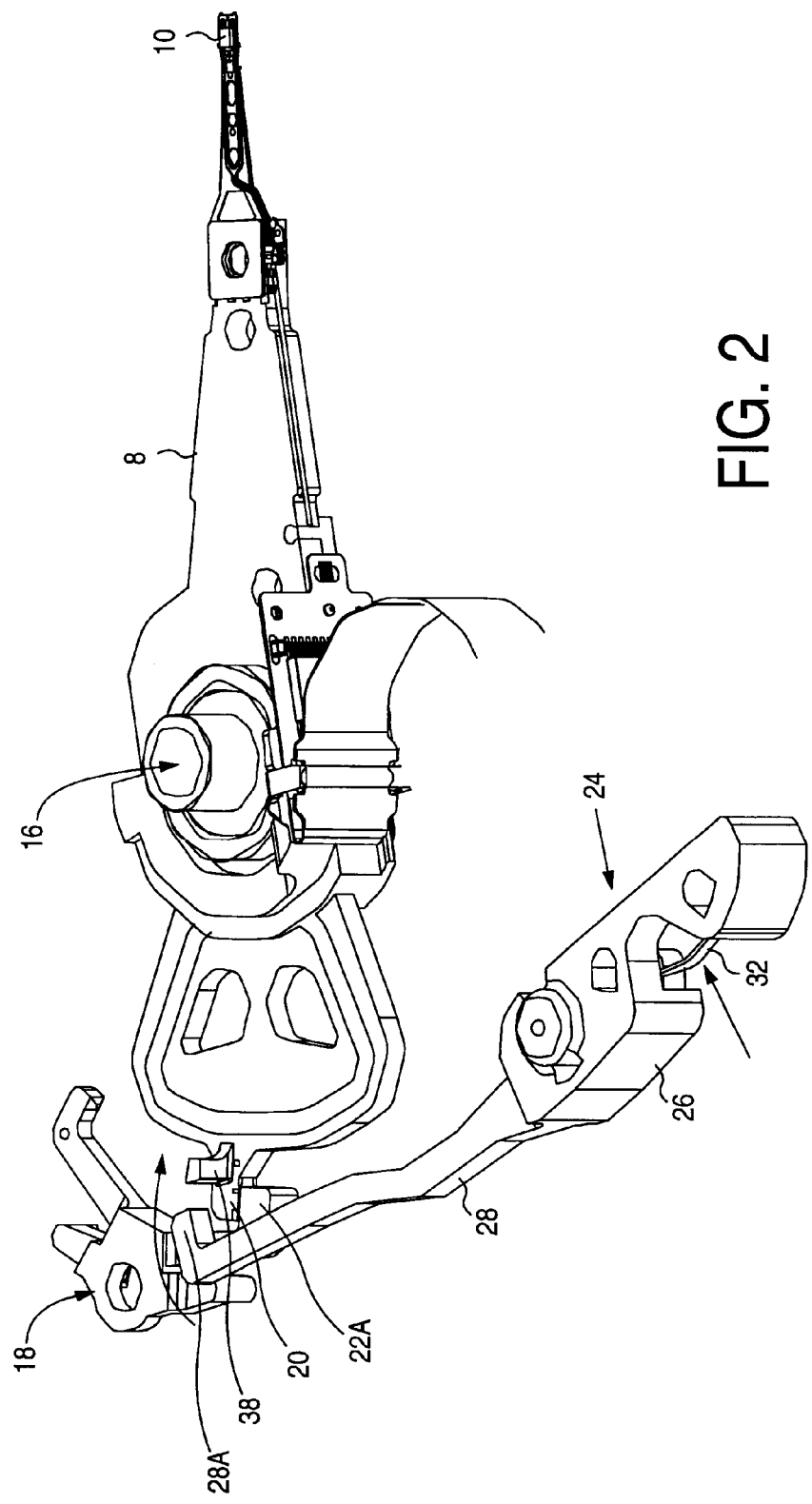

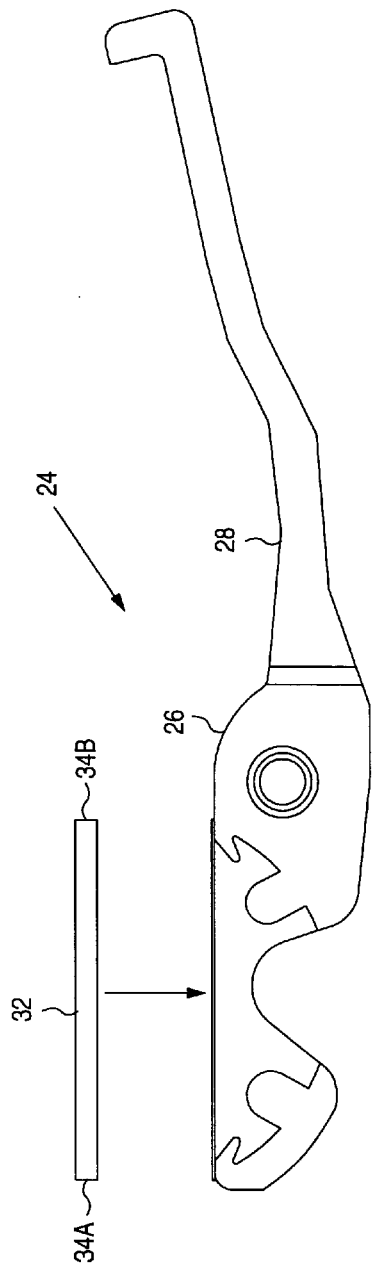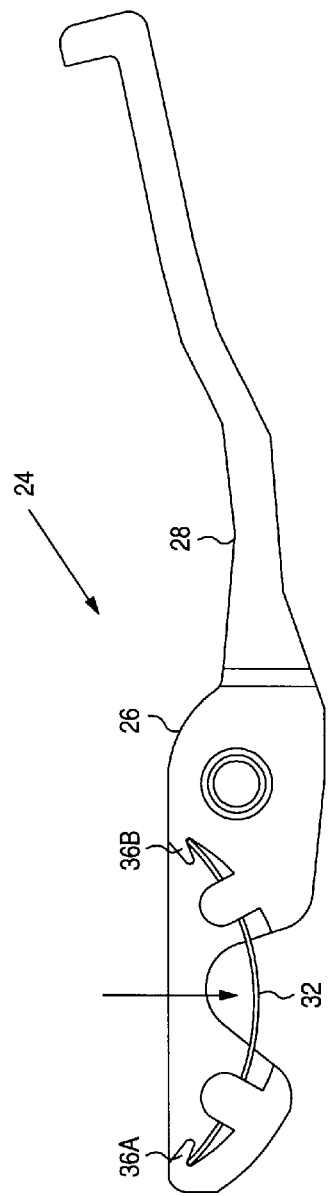
FIG. 3A
FIG. 3B

DISK DRIVE COMPRISING AN INERTIAL ACTUATOR LATCH WITH STRIP-SPRING BIASING

CROSS REFERENCE TO RELATED APPLICATIONS AND PATENTS

This application is related to patent application Ser. No. 09/728,293, now U.S. Pat. No. 6,535,358 entitled "DISK DRIVE COMPRISING A PLASTIC MOLDED CRASH STOP WITH EMBEDDED MAGNET FOR LATCHING AN ACTUATOR ARM" filed on Nov. 30, 2000, the disclosure of which is incorporated herein by reference.

BACKGROUND OF THE INVENTION

1. Field of the Invention

The present invention relates to disk drives for computer systems. More particularly, the present invention relates to a disk drive comprising an inertial actuator latch with strip-spring biasing.

2. Description of the Prior Art

A computer system usually includes one or more disk drives for economical, non-volatile data storage. Prior art disk drives typically comprise a base for housing a disk and a head attached to a distal end of an actuator arm. A spindle motor rotates the disk about its axis, and a voice coil motor (VCM) rotates the actuator arm about a pivot in order to position the head radially over the disk. A crash stop is provided which facilitates latching the head in a park position while the disk drive is powered down in order to protect the data recorded on the disk as well as prevent damage to the head. The head may be parked on a landing zone on the inner diameter (ID) of the disk, or alternatively, the head may be parked on a ramp located at the periphery of the disk (a.k.a., ramp loading/unloading).

The actuator arm comprises a tang attached to a base end and positioned between a first arm and second arm of the crash stop. The second arm presents a physical barrier to the tang so as to limit the stroke of the actuator arm, thereby preventing the head from exceeding a radial limit (e.g., the edge of the disk). The first arm comprises a parking latch with a magnet for latching the tang to the first arm, thereby safely parking the head (e.g., on the inner diameter of the disk). In order to prevent damaging the head as well as the surface of the disk, the force from the magnetic parking latch helps prevent the actuator arm from unlatching when the disk drive is subjected to an external, physical shock. However, the actuator arm will unlatch if the physical shock is of sufficient magnitude, particularly if the physical shock causes the disk drive to rotate such that the magnetic parking latch is jerked away from the tang.

In prior art disk drives an inertial latch has been employed which prevents the actuator arm from unlatching when the disk drive is subjected to large rotational shocks. The inertial latch comprises a protruding arm which rotates about a pivot and "catches" the actuator arm to prevent it from unlatching during a rotational shock. The inertial latch also comprises a biasing mechanism for applying a biasing force to the arm in order to reposition it when the rotational shock subsides. Prior art inertial latches employ a torsion spring comprised of a wound coil which provides resistance to torque, thereby providing the biasing force against the rotation of the arm. However, torsion springs are complicated and expensive to manufacture, and their spring characteristics (e.g., spring constant) are sensitive to dimensional tolerances. Further, installing the torsion spring is difficult and requires a high degree of accuracy which further increases the cost and manufacturing complexity of the inertial latch.

Another problem with prior art torsion springs is the linear relationship between the displacement of the spring versus the load as illustrated in FIG. 6A. Because the relationship is substantially linear, it is difficult to design the torsion spring so that the inertial latch operates properly when the disk drive is subjected to small rotational shocks. Thus, the magnetic parking latch within the crash stop is typically designed to withstand larger rotational shocks than would be necessary if the spring load curve of the inertial latch were more constant. Designing the magnetic parking latch with a higher latching force to compensate for the insensitivity of a torsion spring further increases the cost of the disk drive.

There is, therefore, a need for a disk drive employing an improved inertial latch that is more cost-effective to manufacture and install, and more sensitive to small physical shocks.

SUMMARY OF THE INVENTION

The present invention may be regarded as a disk drive comprising a disk, an actuator arm, a head attached to a distal end of the actuator arm, a voice coil motor for rotating the actuator arm to position the head radially over the disk, a parking latch for latching the actuator arm in a latched position in order to park the head during a non-operating mode, a post, and an inertial latch for maintaining the actuator arm in the latched position when the disk drive is subjected to a physical shock. The inertial latch comprises a body having a protruding arm, a pivot surface, and a strip-spring comprising a first end inserted into a first receptor and a second end inserted into a second receptor such that the strip spring has an initial arc displacement when installed into the body. During the physical shock the body rotates about the pivot surface causing the protruding arm to engage the actuator arm and the strip-spring to press against the post to generate a biasing force. When the physical shock subsides, the biasing force rotates the body about the pivot surface to disengage the protruding arm from the actuator arm.

The strip-spring comprises any suitable shape, such as a substantially rectangular or cylindrical strip, and comprises any suitable material. In one embodiment, the strip-spring comprises a plastic film, and in another embodiment the initial arc displacement generates a restraining force for restraining the strip-spring within the inertial latch. In yet another embodiment, a dimension of the strip-spring (e.g., a length, width or thickness) is selected relative to a spring characteristic of the strip-spring.

The present invention may also be regarded as a method of manufacturing an inertial latch for use in a disk drive comprising a disk, an actuator arm, a head attached to a distal end of the actuator arm, and a voice coil motor for rotating the actuator arm to position the head radially over the disk. The method comprises the steps of providing a strip-spring comprising a first end and a second end and forming a body comprising a protruding arm, and a pivot surface about which the body rotates to engage the protruding arm with the actuator arm during a physical shock. The body is formed with a first receptor for receiving the first end of the strip-spring and a second receptor for receiving the second end of the strip-spring. The method further comprises the step of pushing the strip-spring into the first and second receptors such that the strip-spring comprises an initial arc displacement.

The present invention may also be regarded as an inertial latch for use in a disk drive, the disk drive comprising a disk, an actuator arm, a head attached to a distal end of the actuator arm, and a voice coil motor for rotating the actuator arm to position the head radially over the disk. The inertial latch comprises a strip-spring comprising a first end and a second end, and a body comprising a protruding arm and a pivot surface about which the body rotates to engage the protruding arm with the actuator arm during a physical shock. The body further comprises a first receptor for receiving the first end of the strip-spring and a second receptor for receiving the second end of the strip-spring, wherein the strip-spring has an initial, arc displacement when installed into the inertial latch.

BRIEF DESCRIPTION OF THE DRAWINGS

FIG. 1 is an exploded view of a disk drive comprising a head attached to a distal end of an actuator arm, a crash stop for latching the actuator arm in a parked position, and an inertial latch for latching the actuator arm in the parked position to protect against physical shocks to the disk drive according to an embodiment of the invention.

FIG. 2 shows details of the inertial latch as comprising a protruding arm for engaging the actuator arm during the physical shock, and a strip-spring for providing a biasing force to disengage the protruding arm from the actuator arm when the shock subsides.

FIGS. 3A and 3B illustrate how the inertial latch is manufactured according to an embodiment of the present invention by pushing the strip-spring into first and second receptors such that the strip-spring comprises an initial arc.

DESCRIPTION OF THE PREFERRED EMBODIMENTS

Figure 4A:
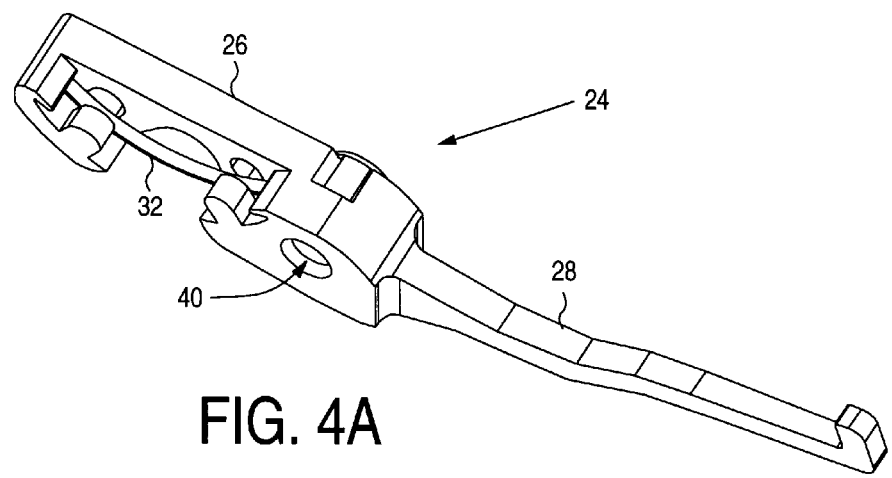
FIGS. 4A and 4B show perspective views of the inertial latch.

FIG. 1 shows a disk drive 2 according to an embodiment of the present invention comprising a disk 6, an actuator arm 8, a head 10 attached to a distal end of the actuator arm 8, a voice coil motor 14 for rotating the actuator arm 8 about a pivot 16 to position the head 10 radially over the disk 6, a parking latch for latching the actuator arm 8 in a latched position in order to park the head 10 during a non-operating mode, a post 23, and an inertial latch 24 for maintaining the actuator arm 8 in the latched position when the disk drive 2 is subjected to a physical shock. As illustrated in FIG. 2, the inertial latch 24 comprises a body 26 having a protruding arm 28, a pivot surface 30 (FIG. 4C), and a strip-spring 32 (FIGS. 3A and 3B) comprising a first end 34A inserted into a first receptor 36A and a second end 34B inserted into a second receptor 36B such that the strip spring 32 has an initial arc displacement when installed into the body 26. During the physical shock the body 26 rotates about the pivot surface 30 causing the protruding arm 28 to engage the actuator arm 8 and the strip-spring 32 to press against the post 23 to generate a biasing force. When the physical shock subsides, the biasing force rotates the body 26 about the pivot surface to disengage the protruding arm 28 from the actuator arm 8.

In the embodiment of FIG. 2, the parking latch comprises a magnet embedded within the first arm 22A of the crash stop 18. The tang 20 at the base end of the actuator arm 8 comprises a metal plate attracted by the magnetic flux generated by the magnet so as to latch the tang 20 to the first arm 22A of the crash stop 18, thereby parking the head 10. Further details concerning the crash stop 18 and parking latch are disclosed in the above-referenced patent application entitled "DISK DRIVE COMPRISING A PLASTIC MOLDED CRASH STOP WITH EMBEDDED MAGNET FOR LATCHING AN ACTUATOR ARM".

In the embodiment of FIG. 2, the actuator arm 8 further comprises a tab 38 attached to (or formed integral with) the tang 20. The protruding arm 28 of the inertial latch 24 comprises a hook member 28A at its distal end. When the body 26 of the inertial latch 24 rotates due to a physical shock, the hook member 28A of the protruding arm 28 engages the tab 38 so as to prevent the tang 20 from unlatching. As the body 26 rotates, the strip-spring 32 presses against a post 23 creating a load on the strip-spring 32 in the direction of the arrow shown in FIG. 2. This load results in a biasing force which rotates the body 26 about the pivot surface 30 to disengage the hook member 28A from the tab 38 when the physical shock subsides.

The strip-spring 32 comprises any suitable shape, such as a substantially rectangular or cylindrical shape, and comprises any suitable material. In one embodiment, the strip spring 32 comprises a plastic film such as mylar. FIGS. 3A and 3B illustrate a method of manufacturing the inertial latch 24 according to an embodiment of the present invention. A substantially rectangular strip-spring 32 comprising a first end 34A and a second end 34B is placed over an opening to an arc-shaped cavity of the body 26 of the inertial latch 24 as illustrated in FIG. 3A. The strip-spring 32 is then pushed into the arc-shaped cavity until the first and second ends 34A and 34B snap into the first and second receptors 36A and 36B as illustrated in FIG. 3B. In the embodiment of FIG. 3B, the first and second receptors 36A and 36B comprise a hook-latch for latching the first and second ends 34A and 34B of the strip-spring 32. The initial arc displacement of the strip spring 32 generates a restraining force for restraining the strip-spring 32 within the inertial latch 24. This reduces the manufacturing time and expense as compared to the difficulty of accurately installing a torsion spring into a prior art inertial latch.

Figure 4B:
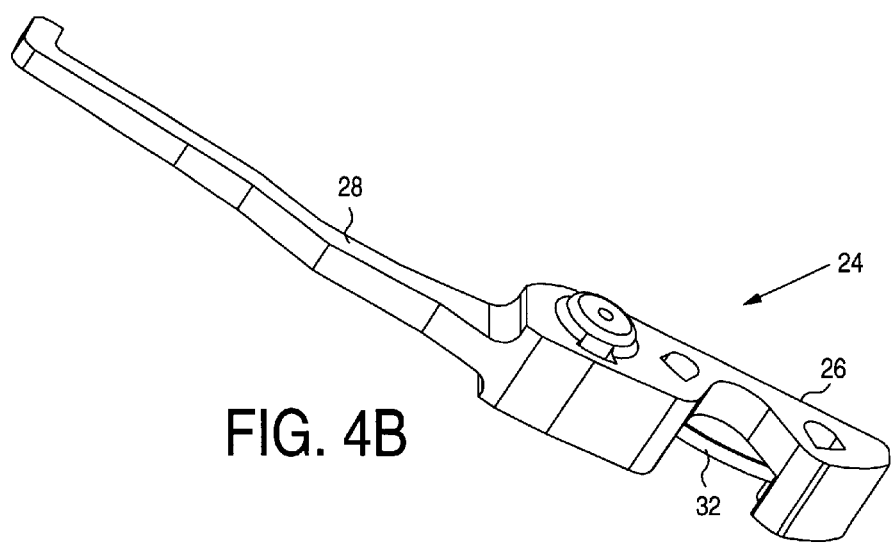
Figure 4C:
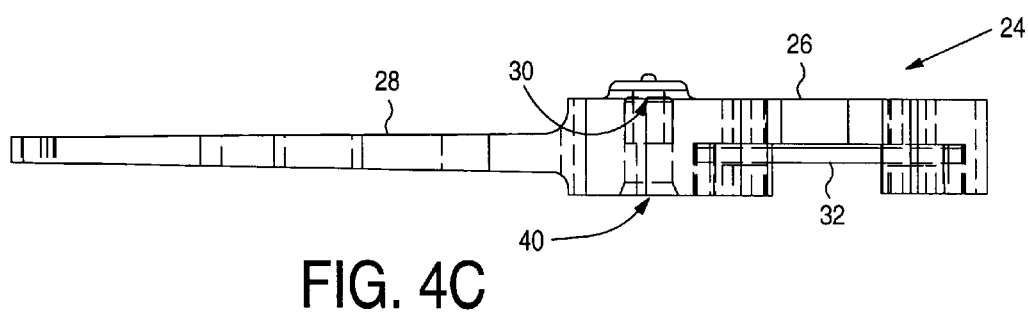
FIG. 4C shows a side view of the inertial latch.

FIG. 4A shows a bottom/front perspective view of the inertial latch 24, FIG. 4B shows a top/rear perspective view of the inertial latch 24 and FIG. 4C shows a side/rear view of the inertial latch 24. As shown in FIG. 4A, the inertial latch 24 comprises a round opening 40 to a cylindrical cavity formed within the body 26 of the inertial latch 24. The inertial latch 24 is installed over a post 42 within the disk drive 2 (FIG. 1) such that the post 42 is disposed axially through the cylindrical cavity until a top surface of the post 42 abuts an interior of pivot surface 30 (FIG. 4C) of the body 26. The pivot surface 30 of the body 26 thus rotates about the top surface of the post 42.

Figure 5:
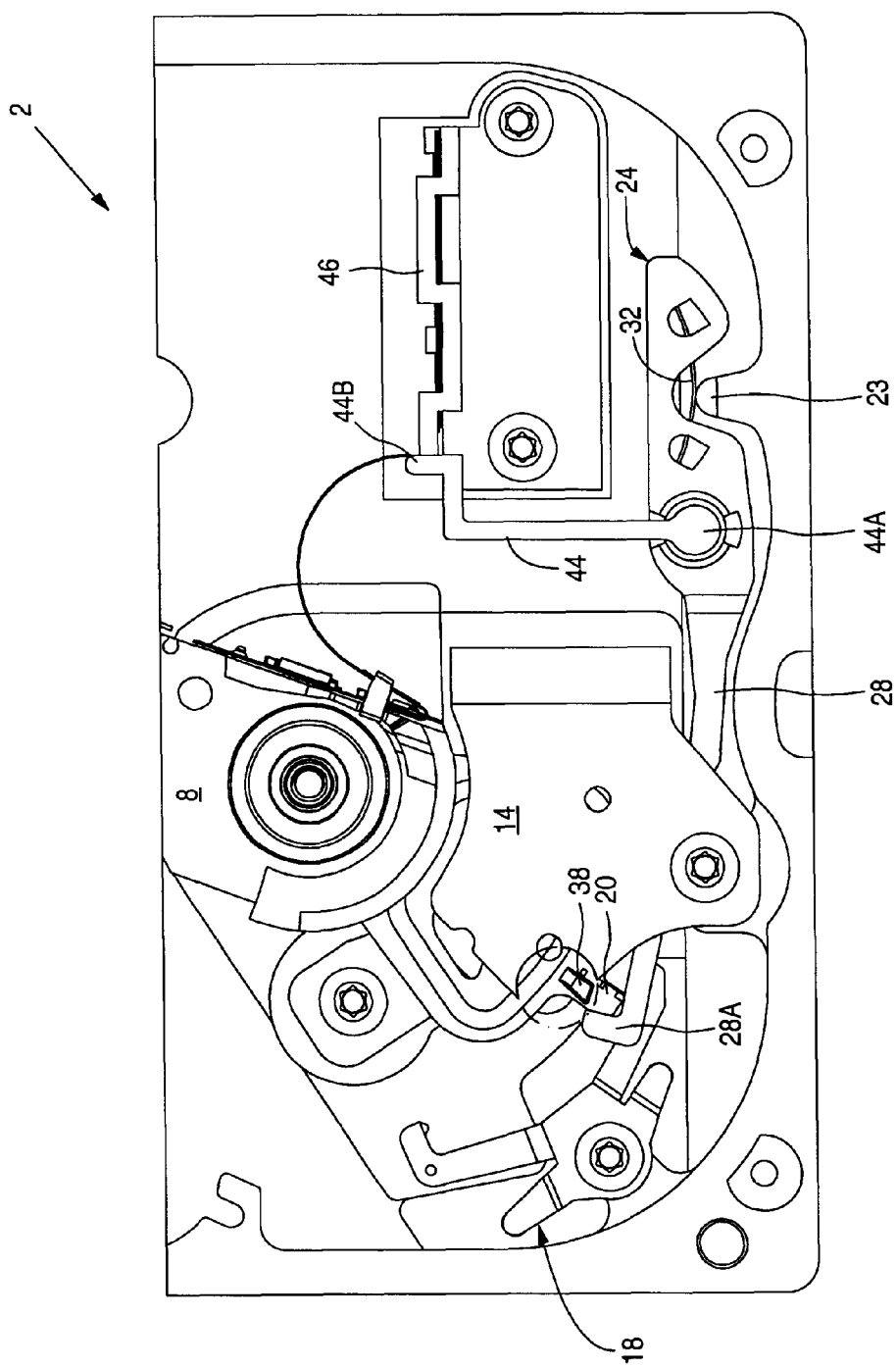
FIG. 5 shows the inertial latch installed into the disk drive of FIG. 1.

FIG. 5 shows a top view of the disk drive 2 of FIG. 1, including the orientation of the inertial latch 24 with respect to other surrounding components. The inertial latch 24 is shown in its normal, unlatched position. When the disk drive 2 is subject to a physical shock, the inertial latch 24 rotates in a clockwise direction such that the protruding arm 28 engages the actuator arm 8 (e.g., the hook member 28A engages the tab 38) to prevent the actuator arm 8 from unlatching. As the inertial latch 24 rotates, the post 23 presses against the strip spring 32 creating the biasing force which rotates the inertial latch 24 back into its normal position when the physical shock subsides. In the embodiment shown in FIG. 5, a restraining member 44 having a first end 44A attached to the top of the inertial latch 24 and a second end 44B attached to the base 4 of the disk drive (through support member 46) stabilizes the inertial latch 24 as it rotates about the pivot surface 30 (FIG. 4C).

Figure 6A:
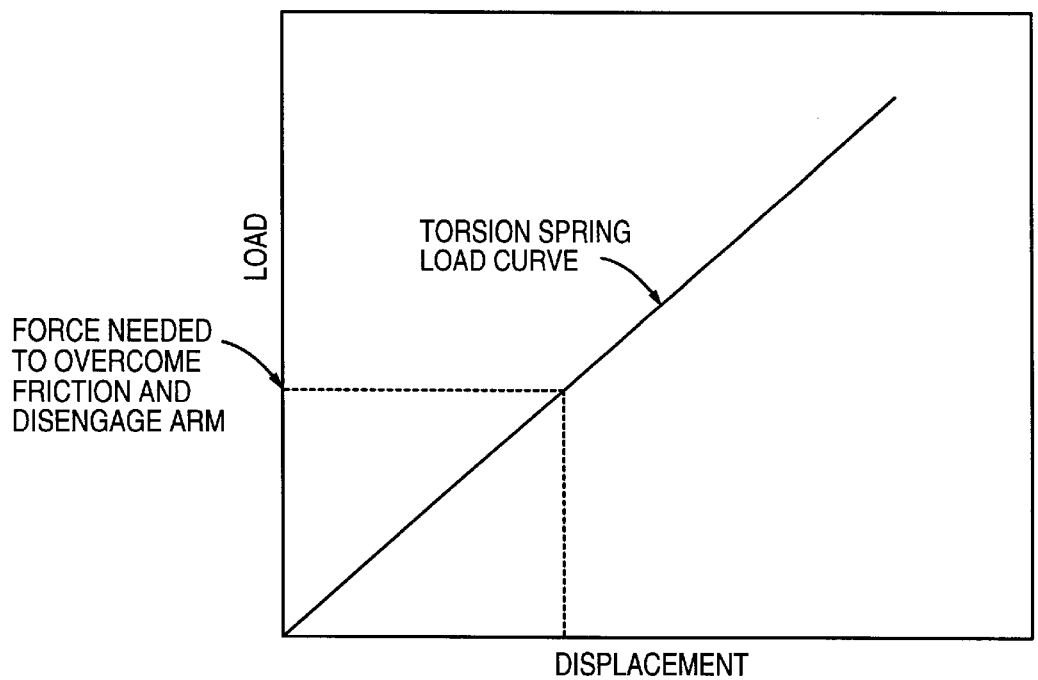
FIG. 6A is a load curve for a prior art torsion spring illustrating the substantially linear relationship between the load on the torsion spring versus the displacement of the torsion spring.
Figure 6B:
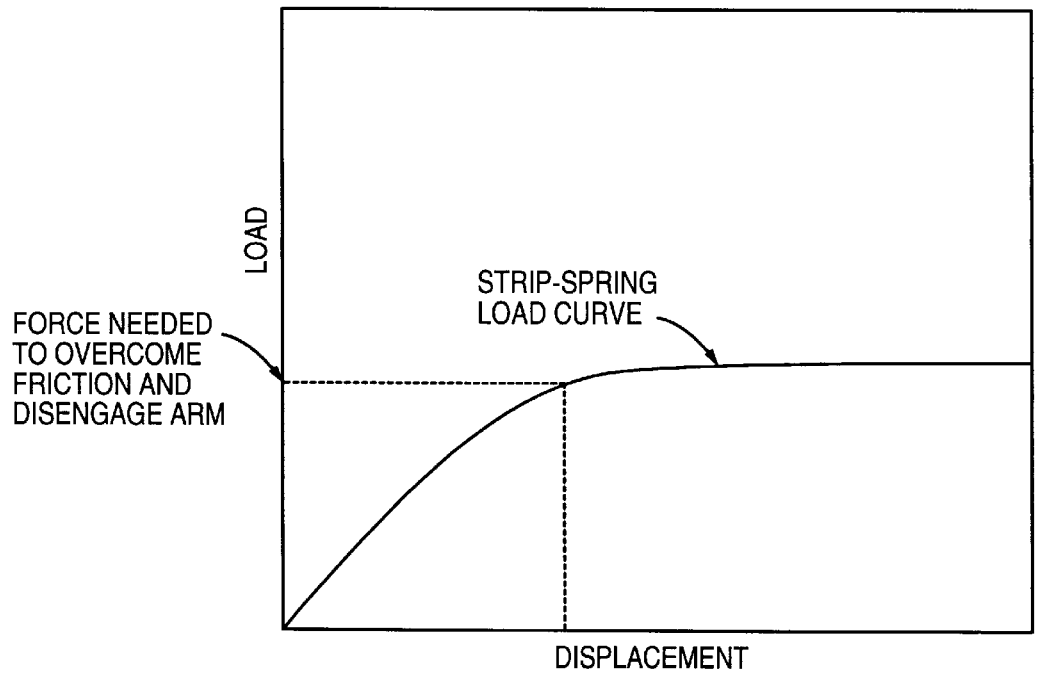
FIG. 6B is a load curve for a strip-spring according to an embodiment of the present invention illustrating the substantially constant relationship between the load on the strip-spring versus the displacement of the strip-spring beyond a certain load.

FIG. 6B is a load curve for a strip-spring according to an embodiment of the present invention illustrating the substantially constant relationship between the load on the strip-spring versus the displacement of the strip-spring beyond a certain load. Because the load curve is substantially constant beyond a certain load, the inertial latch is more sensitive to smaller physical shocks. In one embodiment, the strip-spring dimensions (e.g., length, width and thickness) are selected to achieve a desired spring characteristic. In one embodiment, the dimensions are selected such that the load curve transitions to a substantially constant relationship at a load slightly greater than the force needed to overcome the friction and rotate the inertial latch 24 back into its normal position after a physical shock (see FIG. 6B). In this manner, the inertial latch 24 will properly rotate and engage the actuator arm 8 in the presence of small physical shocks which are slightly greater than the friction force of the inertial latch 24.

We claim:

1. A disk drive comprising:
   (a) a disk;
   (b) an actuator arm;
   (c) a head attached to a distal end of the actuator arm;
   (d) a voice coil motor for rotating the actuator arm to position the head radially over the disk;
   (e) a parking latch for latching the actuator arm in a latched position in order to park the head during a non-operating mode;
   (f) a post; and
   (g) an inertial latch for maintaining the actuator arm in the latched position when the disk drive is subjected to a physical shock, the inertial latch comprising a body comprising:
      a protruding arm;
      a pivot surface;
      a strip-spring comprising a first and second end; and
      a first receptor for receiving the first end of the strip-spring and a second receptor for receiving the second end of the strip-spring such that the strip-spring has an initial arc displacement when installed into the body, wherein:
         during the physical shock the body rotates about the pivot surface causing the protruding arm to engage the actuator arm and the strip-spring to press against the post between the first end and the second end of the strip-spring to generate a biasing force; and
         when the physical shock subsides, the biasing force rotates the body about the pivot surface to disengage the protruding arm from the actuator arm.

2. The disk drive as recited in claim 1, wherein the strip-spring comprises a substantially rectangular strip.

3. The disk drive as recited in claim 1, wherein the strip-spring comprises a substantially cylindrical strip.

4. The disk drive as recited in claim 1, wherein the strip-spring comprises a plastic film.

5. The disk drive as recited in claim 1, wherein the first receptor comprises a hook-latch and the second receptor comprises a hook-latch.

6. The disk drive as recited in claim 5, wherein the strip-spring is installed into the inertial latch by pushing the strip-spring into the first and second receptors.

7. The disk drive as recited in claim 1, wherein the initial arc displacement generates a restraining force for restraining the strip-spring within the inertial latch.

8. The disk drive as recited in claim 1, wherein a dimension of the strip-spring is selected relative to a spring characteristic of the strip-spring.

9. The disk drive as recited in claim 8, wherein the dimension of the strip-spring comprises a width of the strip-spring.

10. The disk drive as recited in claim 8, wherein the dimension of the strip-spring comprises a length of the strip-spring.

11. The disk drive as recited in claim 8, wherein the dimension of the strip-spring comprises a thickness of the strip-spring.

12. An inertial latch for use in a disk drive, the disk drive comprising a disk, an actuator arm, a head attached to a distal end of the actuator arm, and a voice coil motor for rotating the actuator arm to position the head radially over the disk, the inertial latch comprising:
   (a) a strip-spring comprising a first end and a second end; and
   (b) a body comprising:
      a protruding arm;
      a pivot surface about which the body rotates to engage the protruding arm with the actuator arm during a physical shock; and
      a first receptor for receiving the first end of the strip-spring and a second receptor for receiving the second end of the strip-spring, wherein:
         the strip-spring has an initial arc displacement when installed into the inertial latch; and
         a biasing force is generated between the first end and the second end of the strip spring to disengage the protruding arm from the actuator arm when the physical shock subsides.

13. The inertial latch as recited in claim 12, wherein the strip-spring comprises a substantially rectangular strip.

14. The inertial latch as recited in claim 12, wherein the strip-spring comprises a substantially cylindrical strip.

15. The inertial latch as recited in claim 12, wherein the strip-spring comprises a plastic film.

16. The inertial latch as recited in claim 12, wherein a dimension of the strip-spring is selected relative to a spring characteristic of the strip-spring.

* * * * *